Aug. 9, 1927.
V. LINK
1,638,588
BRAKE
Filed Sept. 5, 1925
4 Sheets-Sheet 1
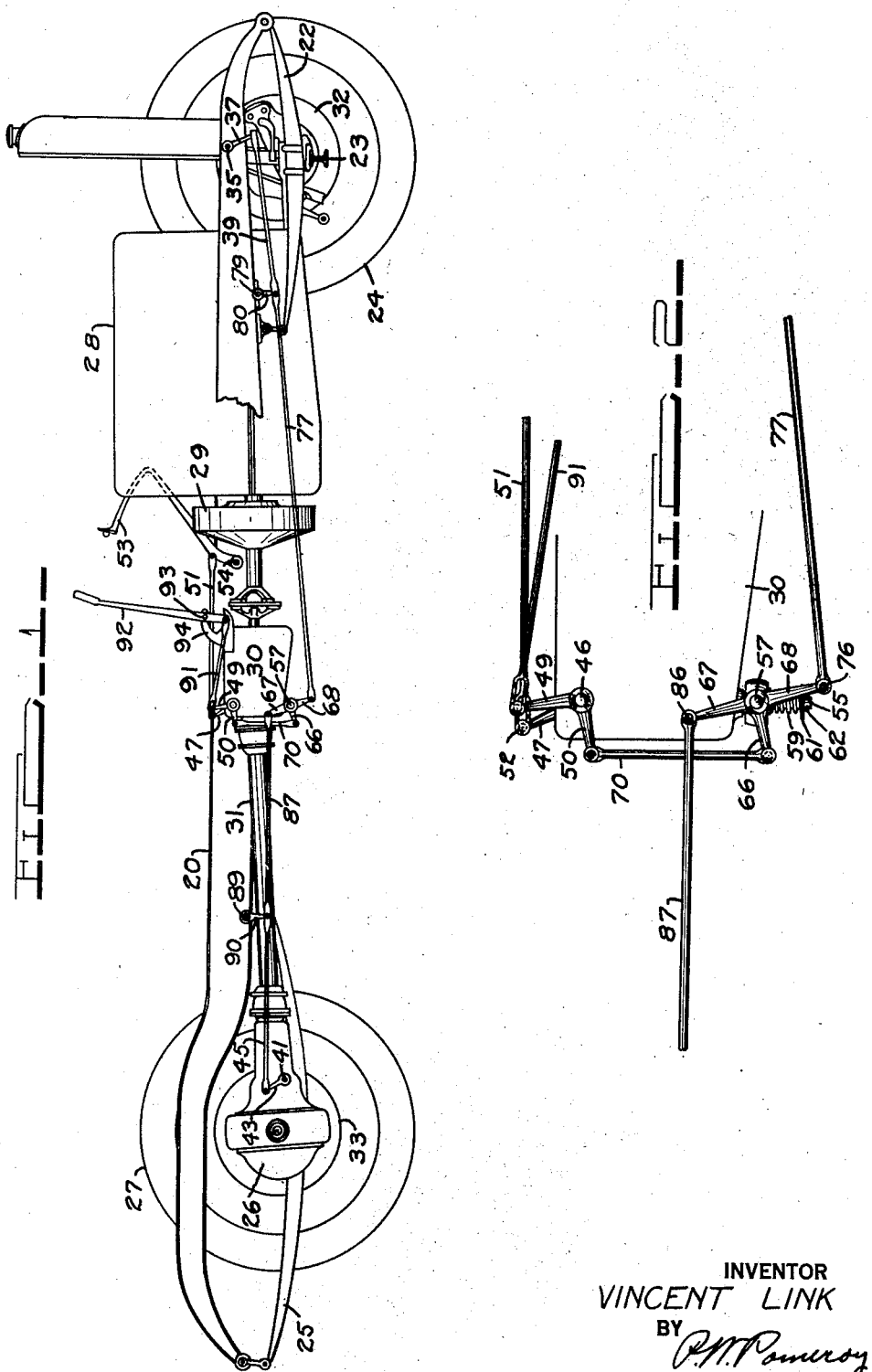
INVENTOR
VINCENT LINK
BY
ATTORNEY Aug. 9, 1927.
V. LINK
1,638,588
BRAKE
Filed Sept. 5, 1925
4 Sheets-Sheet 2
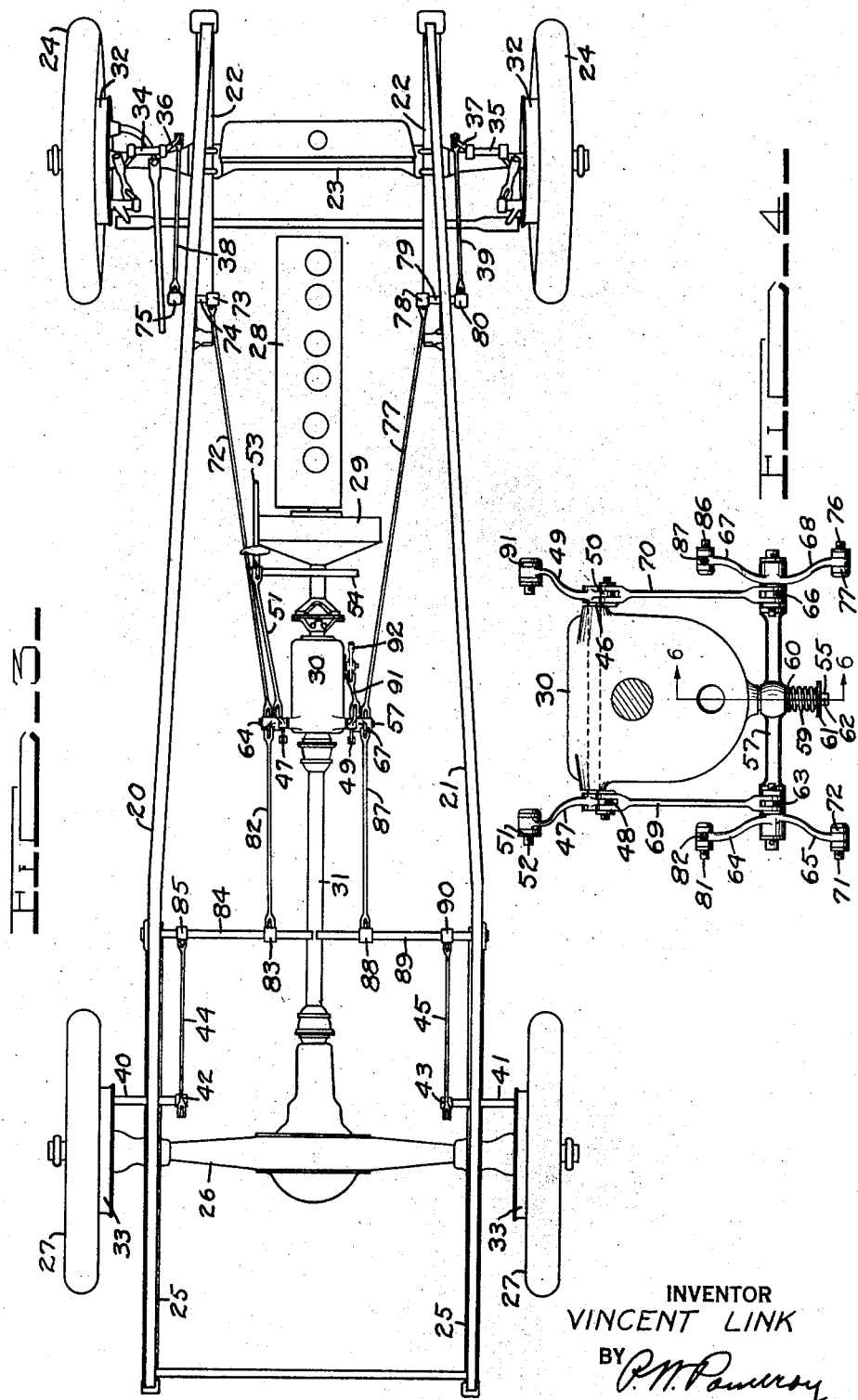
INVENTOR
VINCENT LINK
BY
ATTORNEY Aug. 9, 1927.                     V. LINK                1,638,588
                                   BRAKE
                            Filed Sept. 5, 1925         4 Sheets-Sheet 3
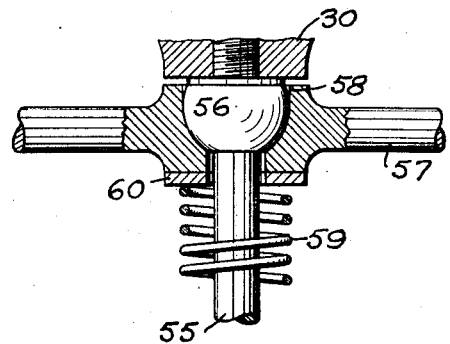
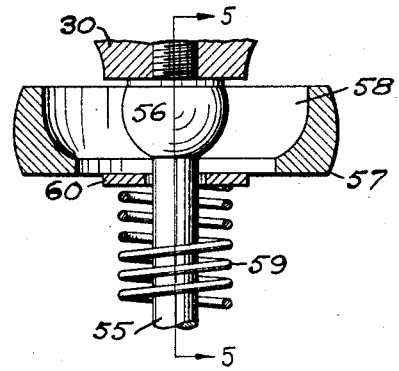
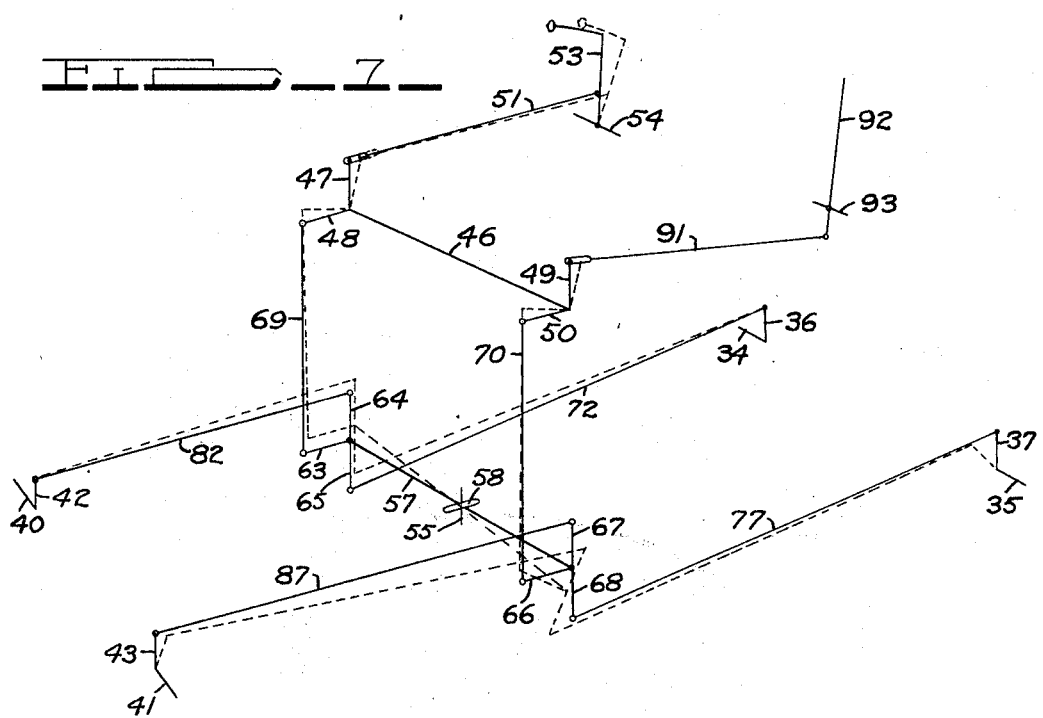
INVENTOR
VINCENT LINK
BY
ATTORNEY

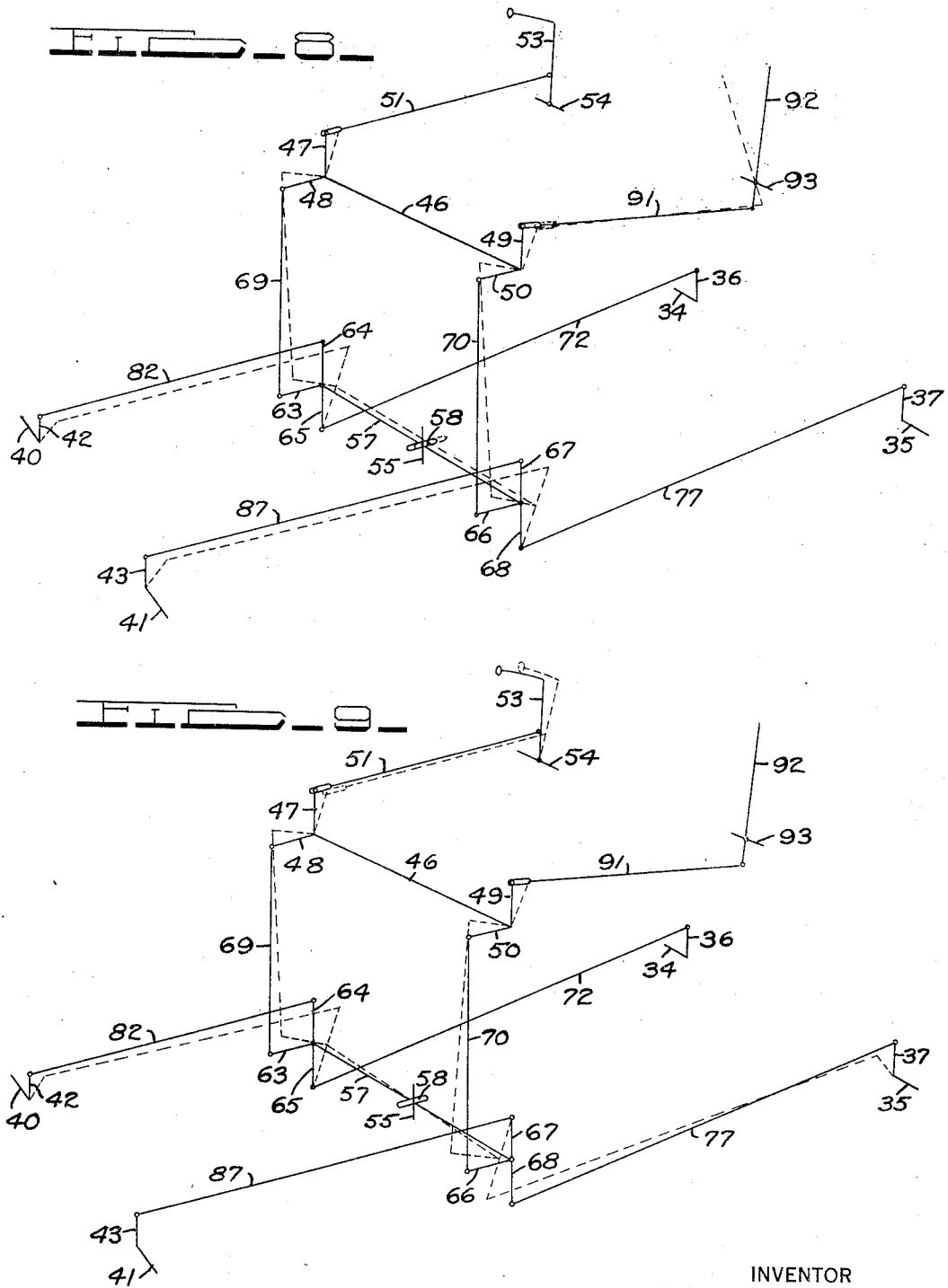

Patented Aug. 9, 1927.

1,638,588

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed September 5, 1925. Serial No. 54,709.

This invention relates to braking means for motor vehicles and the like, and more particularly to those vehicles having brakes on all four wheels, and refers to means for equalizing or balancing the force which is applied to the brakes on the different wheels.

An object of the present invention is to provide a four wheel brake equalizer that will be simple in construction, effective in operation and economical to manufacture.

Another object is to provide a four wheel brake equalizer having a universally movable and slidable bell-crank supporting member through the medium of which the force applied to the different wheels is equalized.

A further object is to provide a four wheel brake equalizer comprising a horizontally disposed rotatable shaft to each end of which is non-rotatably secured a normally horizontally disposed lever, each lever being pivotally connected by a link to one arm of a three armed bell-crank rotatably supported upon the ends of a lever universally and slidably supported at its middle below the plane of the first mentioned shaft, the other two arms of the three armed bell cranks being operatively connected to the front and rear wheel brake on its respective side of the vehicle, and the first mentioned shaft being rotatable at the will of the vehicle operator.

The above being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views, Figure 1 is a side view of an automobile chassis showing an application of the present invention thereto, certain parts being broken away and in section to more clearly show the invention.

Figure 2 is an enlarged side view of the four wheel brake equalizing mechanism.

Figure 3 is a plan view of the chassis shown in Figure 1.

Figure 4 is an enlarged view of the rear of the transmission case of Figures 1 and 3 showing the application of the equalizer thereto.

Figure 5 is a partially sectioned view taken longitudinally through the equalizing bar and its support, as on line 5—5 of Figure 6.

Figure 6 is a transverse sectional view through the equalizing bar and its support as on the line 6—6 of Figure 4.

Figures 7, 8 and 9 are diagrammatic perspective line drawings of the equalizer illustrating its action under varying conditions of equalization.

The automobile chassis shown in the drawings is mainly of conventional construction having side frame members 20 and 21, front springs 22, front axle 23, front wheels 24, rear springs 25, rear axle 26 and rear wheels 27. An engine 28 mounted at the forward end of the frame is connected to the rear axle 26 through the clutch 29, transmission 30 and propeller shaft 31. Each front wheel 24 is provided with a brake drum 32 and each rear wheel 27 with a brake drum 33, and to each brake drum is applied a brake mechanism which may be of any suitable mechanically operated type, the type shown being fully illustrated and explained in my co-pending applications Serial No. 644,078 filed June 8, 1923, Serial No. 665,442 filed September 28, 1923, and Serial No. 735,851 filed September 4, 1924.

The front wheel brake mechanisms are operated by rotating the shafts 34 and 35, levers 36 and 37 being secured to the shafts 34 and 35 respectively to enable the same to be rotated by a pulling movement on the rods 38 and 39 which are pivotally connected to the free ends of the levers 36 and 37 respectively and which extend rearwardly therefrom.

The rear wheel brake mechanisms are operated by rotating the shafts 40 and 41, levers 42 and 43 being secured thereto to enable the same to be rotated by a pulling movement on the rods 44 and 45 which are pivotally connected to the free ends of the levers 42 and 43 respectively and which extend forwardly therefrom.

Rotatably mounted in a horizontal plane and transversely to the length of the chassis in bearings in the upper rear portion of the transmission case 30 is a shaft 46 (Figures 2 and 4) on each end of which is non-rotatably secured a bell-crank, the bell-crank on the left hand side of the shaft 46 being provided with a normally vertically extending arm 47 and a rearwardly and normally horizontally extending arm 48, and the bell-crank on the right hand side of the shaft 46 is provided with similar arms 49 and 50. The free end of the arm 47 is pivotally connected to the slotted rear clevis end of the rod 51 by means of the pin 52 which rod extends forwardly therefrom and is pivotally connected at its forward end to the foot pedal 53 which is pivotally supported on the cross-shaft 54, so that when the foot pedal 53 is depressed it draws the free end of the lever 47 forwardly through the medium of the rod 51 and causes the shaft 46 to rotate. Inasmuch as the bell-crank on the other end of the shaft 46 is secured thereto, it also rotates in accordance with the rotation of the shaft 46.

Projecting downwardly from the center of the bottom of the transmission case 30 directly beneath the shaft 46 is a stud 55 provided with a ball like protuberance 56. A transverse shaft 57, or, as I prefer to call it, an equalizing bar 57, provided with a central elongated slot 58 (see Figures 5 and 6) formed to slidingly engage the ball 56 and at the same time to allow it to have a universal rocking movement thereon, is resiliently supported against the ball 56 by the coil spring 59 which is held in compressed state between the washer 60, which bears against the lower face of the equalizing bar 57, and the washer 61 which is held in position on the stud 55 by means of a pin 62. It will be obvious that the bar 57 may universally rock on the ball 56 and at the same time may shift bodily either forwardly or rearwardly within the limits of the slot 58.

Rotatably supported on each end of the bar 57 is a three arm bell-crank, the one on the left hand side comprising a horizontally extending arm or lever 63, a vertically extending arm 64, and a downwardly extending arm 65, the bell-crank on the right hand side comprising similar arms 66, 67 and 68 respectively. The free end of the arm 63 is pivotally connected to the free end of the arm 48 on the bell crank thereabove by means of a rod 69, and the free end of the arm 66 is similarly connected to the free end of the arm 50 thereabove by the rod 70.

The free end of the arm 65 is pivotally connected by means of a pin 71 to the rod 72 which extends forwardly therefrom and is pivotally connected to the free end of the lever 73 non-rotatably secured to the rotatable shaft 74, supported on the frame side member 20, to the outer end of which shaft another lever 75 is non-rotatably secured and to the free end of which lever the rod 38 is pivotally secured. Similarly the free end of the arm 68 is pivotally secured by the pin 76 to the rod 77 which extends forwardly therefrom to the free end of the lever 78 secured to the inner end of the lever 78 secured to the inner end of the rotatable shaft 79 mounted on the frame side member 21, and the free end of the lever 80 secured to the outer end of the shaft 79 is pivotally connected to the rod 39.

The free end of the arm 64 is pivotally connected by the pin 81 to the rod 82 which extends rearwardly therefrom and is pivotally connected at its rear end to the free end of the lever 83 non-rotatably secured to the inner end of the rotatable cross-shaft 84. The free end of the lever 85, non-rotatably secured to the outer end of the shaft 84, is pivotally connected to the forward end of the rod 44. Similarly the free end of the arm 67 is pivotally connected by the pin 86 to the rod 87 which extends rearwardly therefrom and is pivotally connected to the free end of the lever 88 non-rotatably secured to the inner end of the rotatable cross-shaft 89 to the outer end of which is secured the lever 90 whose free end is pivotally connected to the forward end of the rod 45.

If it is desired to operate all the brakes by either the foot pedal 53 or by a so-called emergency brake lever, the upper end of the arm 49 on the right hand upper two-armed bell crank may be pivotally connected to the rear slotted end of a rod 91, similar to the rod 51, which extends forwardly therefrom and is pivotally connected to the lower end of the emergency brake lever 92 pivotally supported at 93 on the bracket 94 which may be secured to the transmission case 30. By this means the brakes may be utilized both as the service brakes or the emergency brake. The slotted connection on the rear end of the rods 51 and 91, in which the pins which connect the upper ends of the arms 47 and 49 slide, allow either the foot pedal 53 or the emergency brake 92 to be operated independently and without causing movement of the other. It will be readily apparent that when either the foot pedal 53 is depressed or the emergency brake 92 is pulled back, the rods 51 or 92 connected to the arms 47 or 49, according to which is being utilized to apply the brakes, will draw the upper end of the arm 47 or 49 as the case may be, forwardly, causing the shaft 46 to rock. When the shaft 46 is rocked the free ends of the levers 48 and 50, which are non-rotatably secured to the shaft 46, will be raised, thereby raising the rods or links 69 and 70 which in turn raise the free ends of the arms 63 and 66. In event the brakes are all adjusted equally, when the free ends of the arms 63 and 66 are raised, the free ends of the arms 64 and 67 will move forwardly, drawing the links 82 and 87 forwardly and rocking the shafts 40 and 41 through the medium of the lever 83, shaft 84, lever 85, rod 44 and lever 42 on the one side and the lever 88, shaft 89, lever 90, rod 45 and lever 43 on the other side, causing the rear wheel brake mechanisms to be actuated. At the same time that the free ends of the arms 64 and 67 are moving forwardly to apply the rear wheel brakes the free ends of the arms 65 and 68 are moving rearwardly, drawing the rods 72 and 77 rearwardly with them and causing rotation of the shafts 34 and 35 and consequent application of the front wheel brakes through the medium of the lever 73, shaft 74, lever 75, rod 38 and lever 36 on the one side, and the lever 78, shaft 79, lever 80, rod 39 and lever 37 on the other side. This is substantially the action which occurs when all the four brake mechanisms are adjusted so as to be applied with equal movement and all the rods are adjusted to the same or corresponding length, and in such a case the equalizing bar 57 remains stationary and the three armed bell-cranks on its ends rotate thereon.

When, however, one or more of the brakes require more movement to apply the same than another, then the movement imparted to one must be different than that imparted to another, and in such a case the equalizing bar 57 comes into operation to effect the desired result. In order to explain the action in such a case I show in Figures 7, 8 and 9 a diagrammatic perspective line drawing of the layout in normal position, or before equalization has taken place, in full lines, and the position which the parts assume under different conditions of equalization by dotted lines, and in order to better illustrate the action and to simplify the description of the same I have shown the rods 72, 77, 82 and 87 as running directly to the levers 36, 37, 42 and 43 respectively instead of through their respective intermediate cross shafts which are provided merely for supporting the linkages and transmitting the pull nearer to the plane of the wheels.

In Figure 7 is illustrated a condition where the left front brake and the left rear brake are tighter and are taken up quicker than the two brakes on the opposite side of the vehicle. In order to simplify the description and explanation let it be assumed that the solid lines indicate the position of the mechanism at the point where the left front and left rear brakes are taken up, and before the pull has been equalized between them and the two brakes on the opposite side of the vehicle and that the foot pedal 53 is being used to apply the brakes. In such a case assume that the pedal 53 is moved forwardly to the position shown by the dotted lines. This pulls the rod 51 and the upper end of the arm 47 forward, rotating the shaft 46 and causing the arms 48, 49 and 50 to be rotated with it. Due to the slotted connection between the rear end of the emergency brake rod 91 and the upper end of the arm 49, the rod 91 and brake lever 92 will not change their position. As the arms 48 and 50 turn with the shaft 46 their free ends move upwardly, carrying with them the rods 69 and 70 which are pivotally attached to the free ends of the arms 63 and 66 and which therefore raise these ends a corresponding amount. In lifting the free ends of the arms 63 and 66 the tendency is, of course, to cause the three armed bell-cranks of which they form a part to rotate on the bar 57, but due to the fact that the slack in the left hand front and rear brakes is assumed in this case to be taken up, the free ends of the levers 36 and 42 will not move rearwardly and forwardly respectively as they would ordinarily, but remain stationary. This causes the free end of the arm 64 to move upwardly about the free end of the lever 42 as a center, and the free end of the arm 65 to move upwardly about the free end of the lever 36 as a center, causing the three arm bell-crank of which they are a part to move bodily upwardly without materially changing its rotative position in respect to the bar 57, and at the same time causing the left hand end of the bar 57 to be lifted a corresponding amount by tipping it about the ball 56 as a center. As the left hand end of the bar 57 is raised it is obvious that the right hand end will drop a corresponding amount and in so dropping will carry the three armed bell-crank on that end downwardly a corresponding amount. The free end of the arm 66, however, being connected to the free end of the arm 50 by the inextensible connection 70, will remain in the same relative position with respect to the free end of the arm 50 and because of this and the fact that the pivot point of the three armed bell-crank of which it forms a part drops with the right hand end of the bar 57, a rotary motion will be imparted to the three arm bell-crank on that end which will carry the free end of the arm 67 forwardly and the free end of the arm 68 rearwardly, drawing the rods 77 and 87 with them which causes the shafts 35 and 41 to be rotated. This rotative movement of the right hand bell-crank on the bar 57 will continue until the slack in its connected brakes its taken up an amount equal to that taken up in the brakes on the other side of the vehicle, after which both the left and right hand bell-cranks on the bar 57 will rotate together to apply further and equal force to all the brake mechanisms through their respective linkages.

In Figure 8 a condition is illustrated wherein it is assumed that the slack in both front wheel brake mechanisms is taken up before that in both rear wheel brake mechanisms, the solid lines representing the initial position of the mechanism as all the slack in the front wheel brakes is taken up and before the slack in the rear wheel brakes is taken up. In this case, for the purpose of further illustrating the action, it will be assumed that the brakes are being applied by the emergency brake 92. the latter moving back to the position shown by dotted lines, drawing the rod 91 with it, without disturbing the relative position of the foot pedal 53 and rod 51 due to the slot and pin connection between the rear end of the rod 51 and the free end of the arm 47. As the emergency lever 92 is pulled back to the position shown by dotted lines in this view, the rod 91 pulls the free end of the lever 49 forward rotating the shaft 46 and arms 48 and 50 with it as before, the free ends of the arms 48 and 50 drawing up the rods 69 and 70 and the free ends of the arms 63 and 66 in accordance therewith and exerting the usual tendency to rotate the three armed bell-cranks on the end of the bar 57. But as in this case it has been assumed that all the slack has been taken out of the two front wheel brakes, the free ends of the levers 36 and 37 will remain stationary and will hold the free ends of the arms 65 and 68 stationary by means of the rods 72 and 77. This causes the movement imparted to the three armed bell-cranks to rotate them bodily about the free ends of the arms 65 and 68, rotating their pivot points accordingly and shifting the bar 57 bodily forward on the ball 56, the free ends of the arms 64 and 67 moving forwardly and drawing the rods 82 and 87 and levers 42 and 43 with them and rotating the rear wheel brake shafts 40 and 41 until such time as the slack has been taken out of the rear wheel brakes an amount corresponding to that taken out of the front wheel brakes after which the three armed bell-cranks will turn about the ends of the bar 57 and equal pressure will be transmitted to all four brake mechanisms.

In Figure 9 is illustrated still another condition. In this figure it is assumed that the slack in the left front brake and the right rear brake is taken up before that in the left rear and right front brakes, the full lines indicating the position of the mechanism after the slack has been taken out of the first mentioned two brakes and before it has been taken out of the last mentioned two brakes, and the dotted lines indicating the position which the parts assume when the pressure to all the brakes is equalized. In this case it is assumed that the foot pedal 53 is being utilized to apply the brakes the same as in Figure 7. The pedal 53 in moving forward draws with it the rod 51 and the free end of the arm 47, rotating the shaft 46 and arms 48 and 50. The free ends of the arms 48 and 50 in moving upwardly carrying with them the rods 69 and 70 and the free ends of the arms 63 and 66. Inasmuch as the slack is already taken out of the left front brake the free end of the lever 36 will remain stationary, holding the free end of the arm 65 stationary and constraining the three armed bell-crank on the left end of the bar 57 to rotate thereabout as a center. In a similar manner, under the present assumptions, the free end of the lever 43 will remain stationary, holding the free end of the arm 67 stationary and constraining the three armed bell-crank on the right hand end of the bar 57 to rotate thereabout as a center. As the left hand bell crank rotates about the free end of the arm 65 and the right hand bell crank rotates about the free end of the arm 67, the left hand end of the bar 57 will be caused to move forwardly and the right hand end to move rearwardly the bar 57 pivoting in a horizontal plane about the ball 56 until the slack is taken out of the left rear and right front brake mechanisms an amount corresponding to that taken out of the left front and right rear mechanisms, after which the three armed bell-cranks turn about the ends of the bar 57 and transmit equal pull to all four brake mechanisms.

In the foregoing description of Figures 7, 8 and 9, the operation of the mechanism under three varying conditions has been described, first, that which causes the bar 57 to pivot about the ball 56 in a vertical plane to effect the equalization, second, that which causes the bar 57 to shift bodily in a horizontal plane, and third, that which causes the bar 57 to pivot about the ball 56 in a horizontal plane. These three conditions illustrate the essential movements of the mechanism and it will be apparent that any other combination of conditions of unequalization will utilize one or more of the movements described to effect an equalization of the braking pressure to the brake mechanisms and it is believed that the resulting movement of the mechanism under any other condition than those above described will be apparent from a study of the above description and drawings.

While but one specific embodiment of the present invention is herein described and illustrated, it will be apparent that the construction may be modified to suit a variety of different conditions and I do not limit myself to the specific embodiment shown and described, but claim as my invention all that is broadly commensurate with the appended claims.

What I claim is:—

1. In an equalizing mechanism, a bar supported at its middle to be universally movable and bodily shiftable, a plurality of coacting levers rotatably mounted on each end of said bar, means joining the ends of a portion of said levers with devices to be operated, and means for causing equal vertical movement of the ends of two of the remaining levers.

2. In an equalizing mechanism, a rotatable shaft provided with levers secured adjacent the ends thereof, a support, a bar positioned below said shaft supported at its middle and universally movable about and bodily slidable on said support, a three-armed bell-crank rotatably positioned on each end of said bar, means connecting one arm of each of said bell-cranks with said levers on said shaft, means connecting the remaining arms of said bell-cranks with means to be operated, and means for rotating said shaft.

3. In an equalizing mechanism, a universally movable and bodily shiftable bar supported at its middle, a bell-crank having a normally vertical upwardly extending arm, a normally vertical downwardly extending arm and a normally horizontally extending arm rotatably mounted on each end of said bar, means extending in one direction connecting one vertical arm of each of said bell-cranks to a device to be operated, means extending in the opposite direction connecting the other said vertical arm of each of said bell-cranks to a device to be operated, and means for causing equal upward movement of the free ends of said horizontally extending arms.

4. In a vehicle having front and rear wheel brakes, means for equalizing the pressure applied to said brakes comprising a transversely disposed bar universally movable about its middle and bodily movable forwardly and rearwardly, a three armed bell-crank having an upwardly, a downwardly, and a horizontally extending arm rotatably supported on each end of said bar, a shaft rotatably mounted above said bar provided with horizontally extending levers secured thereto above said bell-cranks, means connecting the free ends of said levers with the free ends of said horizontally extending arms therebelow, means connecting said upwardly extending arms with the brakes at one end of said vehicles, means connecting said downwardly extending arms with the brakes at the opposite end of said vehicle, and means operable by the operator of said vehicle for rotating said shaft.

5. In a vehicle having front and rear wheel brakes, mechanism for operating said brakes comprising a rotatable horizontally disposed transverse shaft provided with a pair of horizontally disposed levers and a pair of vertically disposed levers secured thereto, a foot lever connected to one of said vertical levers by a lost motion connection, a hand lever connected to the other of said vertical levers by a lost motion connection, whereby said shaft may be rotated by either said foot lever or said hand lever, a universally movable and bodily shiftable bar positioned below said shaft and supported between its ends, a three-armed bell-crank rotatably supported on said bar below each of said horizontal levers on opposite sides of said support and having a horizontally disposed arm of each connected to the said horizontal lever thereabove, and means connecting the remaining arms of said bell-cranks to said brakes.

6. In a vehicle having front and rear wheel brakes, mechanism for operating said brakes comprising a rotatable horizontally disposed shaft, an upwardly and a horizontally disposed lever secured to each end thereof, a foot lever having a lost motion connection with one of said upwardly disposed levers and a hand lever having a lost motion connection with the other of said upwardly disposed levers, whereby said shaft may be rotated by either said foot lever or said hand lever, a ball support positioned below and midway between said horizontally disposed levers, a transversely disposed bar supported on said ball and provided with a transverse slot co-acting with said ball whereby said bar may tilt and swing and shift bodily relative to said ball, a three-armed bell-crank rotatably supported on each end of said bar, one arm of each of said bell-cranks being connected to the said horizontally disposed lever thereabove, another arm of each of said bell-cranks being operatively connected to a front wheel brake on its respective side of said vehicle, and the remaining arm of each of said bell cranks being operatively connected to a rear wheel brake on its respective side of said vehicle.

7. In a vehicle having front and rear wheel brakes, means for operating said brakes comprising a rotatable shaft, means operatively connected to said shaft and said brakes, and means universally movable and bodily shiftable connected with said last-named means to distribute the pressure on said brakes whereby an equal braking pressure will be applied to each of said brakes.

Signed by me at Detroit, Michigan, U. S. A., this 2nd day of September 1925.

VINCENT LINK.